US005956535A

United States Patent [19]

Tohyama

[11] Patent Number: 5,956,535

[45] **Date of Patent: *Sep. 21, 1999**

[54] FLASH DEVICE

[75] Inventor: Kei Tohyama, Sagamihara, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,768

[22] Filed: Feb. 25, 1997

[30] Foreign Application Priority Data

Mar. 1, 1996 [JP] Japan .................................... 8-068976

[51] Int. Cl.[6] ............................ G03B 15/03; H05B 37/00

[52] U.S. Cl. ........................................ 396/159; 315/241 P

[58] Field of Search ..................................... 396/155, 156, 396/159, 161, 163, 164, 173, 205; 315/156, 157, 158, 241 P

[56] References Cited

U.S. PATENT DOCUMENTS

| | | | |
|---|---|---|---|
| 4,592,639 | 6/1986 | Nakamura | 396/155 |
| 5,260,737 | 11/1993 | Takahashi | 395/155 |

*Primary Examiner*—Safet Metjahic
*Assistant Examiner*—Michael Dalakis
*Attorney, Agent, or Firm*—Robin, Blecker & Daley

[57] ABSTRACT

In a flash device arranged to perform flat emission by detecting the intensity of light emission of a discharge tube during process of the light emission and by controlling the intensity of light emission to become almost constant during process of the light emission, the flat emission is adequately performed by varying a detection level for the intensity of light emission.

20 Claims, 11 Drawing Sheets

FIG. 6

| | VREF (V) | | | | | | | | | | | |
|---|---|---|---|---|---|---|---|---|---|---|---|---|
| | 303 | 278 | 255 | 234 | 214 | 196 | 180 | 165 | 152 | 139 | 127 | 117 |
| VS=330V | 1 | 2 | 2 | 2 | 3 | 3 | 3 | 3 | 4 | 4 | 4 | 4 |
| 303V≦VS<330V | - | 1 | 2 | 2 | 2 | 3 | 3 | 3 | 3 | 4 | 4 | 4 |
| 278V≦VS<303V | - | - | 1 | 2 | 2 | 2 | 3 | 3 | 3 | 3 | 4 | 4 |
| 255V≦VS<278V | - | - | - | 1 | 2 | 2 | 2 | 3 | 3 | 3 | 3 | 4 |

FIG. 8

| TCDA (mS) | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 1 | 2 | 2 | 2 | 3 | 3 | 3 | 3 | 4 | 4 | 4 | 4 |

FIG. 10

| | TCDA (mS) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| VS=330V | 1 | 2 | 2 | 2 | 3 | 3 | 3 | 3 | 4 | 4 | 4 | 4 |
| 303V≦VS<330V | 1 | 1 | 1 | 2 | 2 | 2 | 3 | 3 | 3 | 3 | 4 | 4 |
| 278V≦VS<303V | 0 | 1 | 1 | 1 | 2 | 2 | 2 | 3 | 3 | 3 | 3 | 4 |
| 255V≦VS<278V | 0 | 0 | 1 | 1 | 1 | 2 | 2 | 2 | 3 | 3 | 3 | 3 |

FLASH DEVICE

BACKGROUND OF THE INVENTION

1. Field of the Invention

This invention relates to a flash device arranged to be capable of performing flat emission in which emission of light is continued at a uniform quantity of light when a camera makes a slit exposure with a focal plane shutter, and more particularly to a control over the light emission intensity of the flat emission and a device for carrying out the control.

2. Description of Related Art

It has been practiced to carry out the flat emission in the following manner. A discharge tube is caused to emit light with the energy of electric charge of a main capacitor. When the emission intensity of the discharge tube comes to exceed a setting value, an intensity control means for controlling the intensity of light emission of the discharge tube sends an emission stop signal to an emission control means, composed of an IGBT circuit, etc., for controlling the light emission of the discharge tube. Upon receipt of the emission stop signal, the emission control means causes the discharge tube to stop emitting light. When the emission intensity drops below the setting value due to the pause of the light emission of the discharge tube, the intensity control means sends an emission start signal to the emission control means to cause the discharge tube to resume its light emission. These actions are repeated in this manner to continue the flat emission.

The setting value to be used for control over the intensity of light emission is set, for example, at an emission intensity setting value 303 as shown in FIG. 11(*b*), and the light emission is fixedly controlled by the intensity control means without varying the setting value until the end of the light emission.

In the case of the conventional method described above, the flat emission is controlled according to a fixed setting value during the light emission, as indicated by the setting value 303 in FIG. 11(*b*). Therefore, according to the conventional method, the waveform of light emission becomes aslant downward to the right as shown in FIG. 11(*a*). The slanting waveform is caused for the reason that the charging voltage of the main capacitor varies between a point of time 301 of the start of light emission and a point of time 302 of the end of light emission. As shown in FIGS. 12(*a*) and 12(*b*) which show the waveform of the light emission and the control signal obtained at the start of light emission and at the end of light emission, respectively, a difference in quantity of light emission between a point of time when the emission stop signal (a changing point from a high level to a low level of the control signal 902 or 904) is received and another point of time when the light emission intensity actually begins to drop is smaller at the end of light emission than at the start of light emission. FIG. 12(*a*) shows such a light quantity difference 905 obtained at the start of light emission while FIG. 12(*b*) shows such a light quantity difference 906 obtained at the end of light emission. As apparent from FIGS. 12(*a*) and 12(*b*), the difference 906 is smaller than the difference 905.

Therefore, as indicated by the waveform of light emission in FIG. 11(*a*), the intensity of light emission becomes weak at the time of point 302 of the end of light emission as compared with the point of time 301 of the start of light emission. The conventional method for the flat emission, therefore, has presented a problem that the film is exposed to a less quantity of light at the end of light emission than at the start of light emission.

BRIEF SUMMARY OF THE INVENTION

In accordance with one aspect of this invention, there is provided a flash device arranged to be capable of making flat emission maintained at a constant intensity of light emission by varying a setting value used for control over the intensity of light emission.

In accordance with one aspect of this invention, there is provided a flash device arranged to be capable of making flat emission maintained at a constant intensity of light emission by varying, according to a change in charging voltage of a main capacitor, a setting value used for control over the intensity of light emission.

In accordance with one aspect of this invention, there is provided a flash device arranged to be capable of making flat emission maintained at a constant intensity of light emission by varying, according to a lapse of time from the start of flat emission, a setting value used for control over the intensity of light emission.

In accordance with one aspect of this invention, there is provided a flash device arranged to be capable of making flat emission maintained at a constant intensity of light emission by varying, according to a lapse of time from the start of flat emission and a change in charging voltage of a main capacitor, a setting value used for control over the intensity of light emission.

In accordance with one aspect of this invention, there is provided a flash device arranged to be capable of making flat emission and having a capacitor arranged to store electric energy therein, a discharge tube arranged to convert the electric energy into light, emission control means for controlling light emission of the discharge tube, intensity control means for controlling the intensity of light emission of the discharge tube by outputting an emission stop signal when the intensity of light emission of the discharge tube becomes a setting value or greater and outputting an emission start signal when the intensity of light emission of the discharge tube becomes lower than the setting value, and means for controlling a period of time for which the light emission continues, the flash device comprising variable control means for varying the setting value used by the intensity control means for control over the intensity of light emission, during a period from the start of the flat emission to the end of the flat emission. The variable control means is arranged to control the flat emission so as to maintain the intensity of light emission constant during a period from the start of the flat emission to the end of the flat emission by varying the setting value used for control over the intensity of light emission, so that the intensity of light emission can be maintained constant even if the intensity of light emission varies between the start and the end of the flat emission.

Other aspects, objects and features of this invention will become apparent from the following detailed description of embodiments thereof taken in conjunction with the accompanying drawings.

BRIEF DESCRIPTION OF THE SEVERAL VIEWS OF THE DRAWING

FIG. 6 shows by way of example a setting value correction table in the flash device arranged as the first embodiment shown in FIG. 5.

FIG. 8 shows by way of example a time correction table in the flash device shown in FIG. 7.

FIG. 10 shows by way of example a voltage and time correction table in the flash device shown in FIG. 9.

DETAILED DESCRIPTION OF THE INVENTION

First Embodiment

FIGS. 1 to 6 show a flash device arranged as a first embodiment of this invention.

Figure 1:
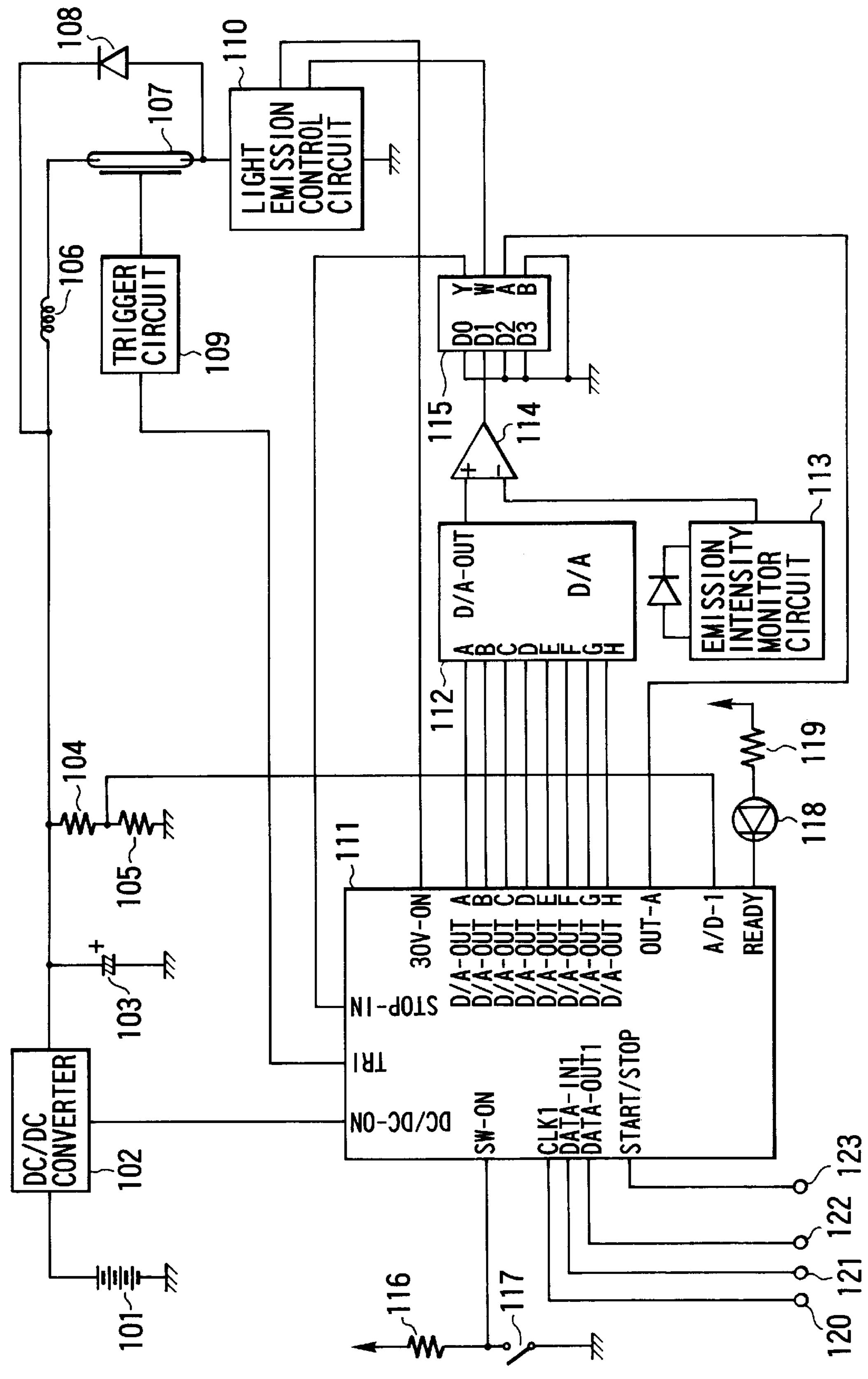
FIG. 1 is a block diagram showing a flash device arranged as a first embodiment of this invention.

FIG. 1 is a block diagram showing the arrangement of the flash device according to the first embodiment.

Referring to FIG. 1, a battery 101 is used as a power supply. A DC/DC converter 102 is arranged to boost the voltage of the power supply 101 according to a signal from an output terminal DC/DC-ON of a microcomputer 111. A main capacitor 103 is arranged to store the electric energy boosted by the DC/DC converter 102. Voltage dividing resistors 104 and 105 are arranged to detect the charging voltage of the main capacitor 103 and to have a voltage dividing point connected to an A/D input terminal A/D-1 of the microcomputer 111.

An inductor 106 is connected to a part between the main capacitor 103 and the anode of a xenon lamp 107. The xenon lamp 107 is arranged to convert the electric energy of the main capacitor 103 into light. A diode 108 has its anode connected to the cathode of the xenon lamp 107 and its cathode connected to the main capacitor 103. A trigger circuit 109 is arranged in a known manner to excite the xenon lamp 107 in response to a signal from an output terminal TRI of the microcomputer 111.

A light emission control circuit 110 is arranged between the cathode of the xenon lamp 107 and the ground to control the light emission of the xenon lamp 107. The microcomputer 111 has output terminals D/A-OUT A to D/A-OUT H which are connected to the input terminals A to H of an A D/A converter 112. The output terminal D/A-OUT of the D/A converter 112 is connected to a non-inverting input terminal of a comparator 114. An emission intensity monitor circuit 113 is arranged to convert the intensity of light emission of the xenon lamp 107 into a voltage output and to supply the voltage output to an inverting input terminal of the comparator 114.

The comparator 114 is arranged to have its output connected to the input terminal D1 of a signal selector 115. The signal selector 115 is arranged to have input terminals D0, D2 and D3 connected to the ground. A select terminal A of the signal selector 115 is connected to an output terminal OUT-A of the microcomputer 111. A select terminal B of the signal selector 115 is connected to the ground. An output terminal Y of the signal selector 115 is connected to an input terminal STOP-IN of the microcomputer 111. An inverting output terminal W of the signal selector 115 is arranged to be supplied to the light emission control circuit 110.

Reference numeral 116 denotes a pull-up resistor. A power supply switch 117 is connected to an input terminal SW-ON of the microcomputer 111 and is arranged to be turned on to cause the microcomputer 111 to begin to operate. Reference numeral 118 denotes an LED and reference numeral 119 denotes a resistor. Connection terminals 120 to 123 are provided for connection with a camera. The terminal 120 is a clock terminal which is connected to a terminal CLK1 of the microcomputer 111 and is arranged for data coming from the camera. The terminal 121 is connected to an input terminal DATA-IN1 of the microcomputer 111 and is arranged to receive a data signal coming from the camera in synchronism with a clock signal received at the clock terminal 120. The terminal 122 is connected to an output terminal DATA-OUT1 of the microcomputer 111 and is arranged to send a signal from the flash device to the camera in synchronism with the clock signal received at the clock terminal 120. The terminal 123 is connected to an input terminal START/STOP of the microcomputer 111 and is arranged as an input terminal for receiving an emission start signal from the camera.

Figure 2:
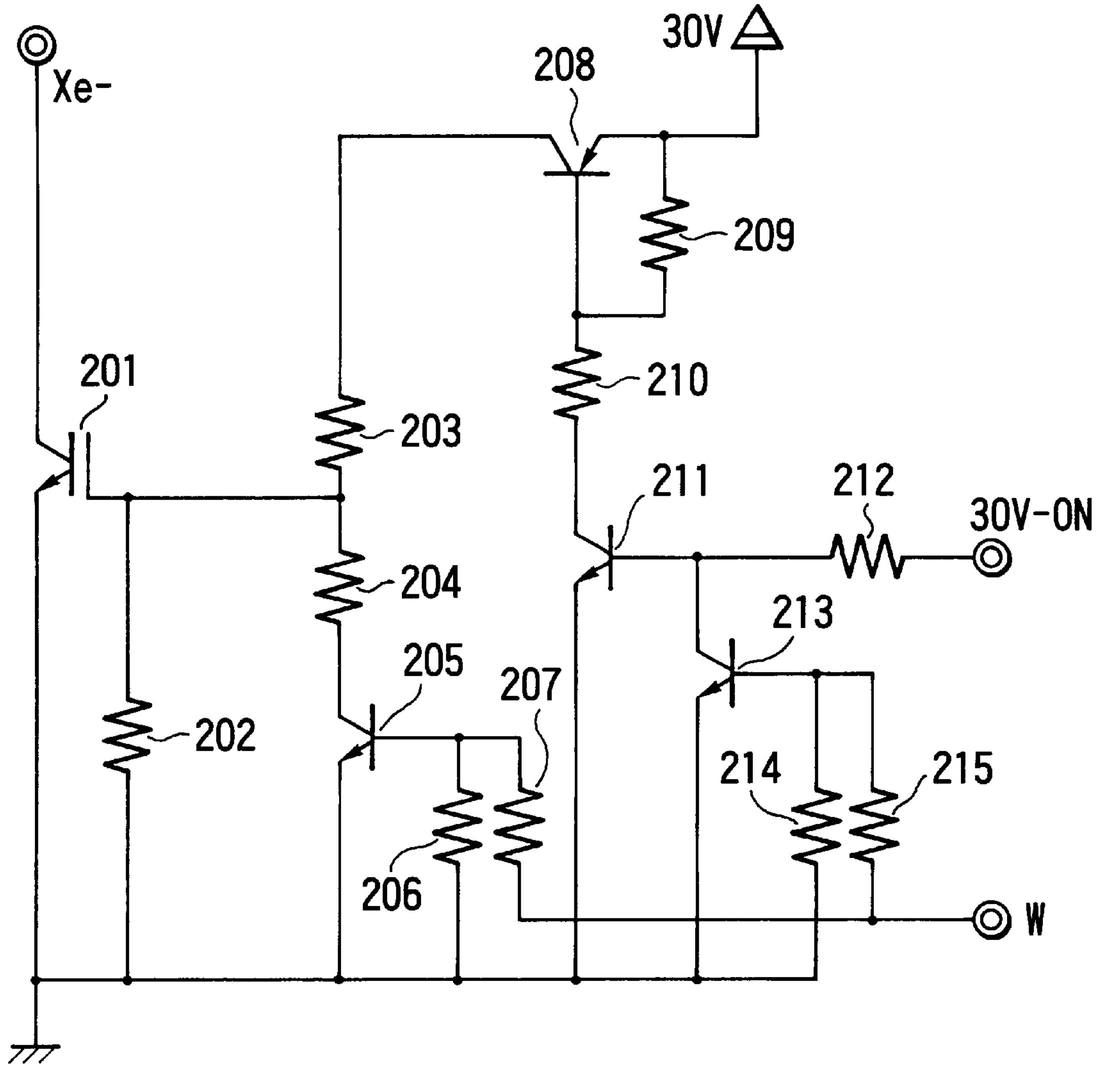
FIG. 2 is a circuit diagram of a light emission control circuit shown in FIG. 1.

FIG. 2 is a circuit diagram showing the details of the light emission control circuit 110 shown in FIG. 1. Referring to FIG. 2, an IGBT (insulated gate bipolar mode transistor) 201 has its collector connected to the cathode of the xenon lamp 107 and its emitter connected to the ground. An output terminal 30V-ON of the microcomputer 111 is connected through a resistor 212 to the base of a transistor 211.

The inverting output terminal W of the signal selector 115 is connected to the base of a transistor 205 through a resistor 207 and is connected to the base of a transistor 213 through a resistor 215. When the level of the inverting output terminal W of the signal selector 115 becomes low and the level of the output terminal 30V-ON of the microcomputer 111 becomes high, the transistor 211 turns on to cause a transistor 208 to turn on. With the transistor 208 turned on, the gate of the IGBT 201 is charged to turn on the IGBT 201 through a resistor 203 with a voltage of a 30V power supply which is not shown. Therefore, if a trigger input is provided, the xenon lamp 107 begins to emit light.

When the level of the inverting output terminal W of the signal selector 115 becomes high, a transistor 213 turns on. Then, the transistors 211 and 208 turn off to stop a current from being supplied to the gate of the IGBT 201, and the transistor 205 turns on to discharge a charge of the gate of the IGBT 201 through the resistor 204. The IGBT 201, therefore, turns off. As a result, the intensity of light emission by the xenon lamp 107 decreases.

In the arrangement described above, the actions of the light emission control circuit 110 are regarded as a means for controlling the light emission of the discharge tube. A series of actions performed by the emission intensity monitor circuit 113, the comparator 114, the microcomputer 111 and the D/A converter 112 are regarded as a means for controlling the intensity of light emission. A setting value varying action to be carried out within the microcomputer 111 which has a correction table stored therein is regarded as a variable control means.

Figure 4:
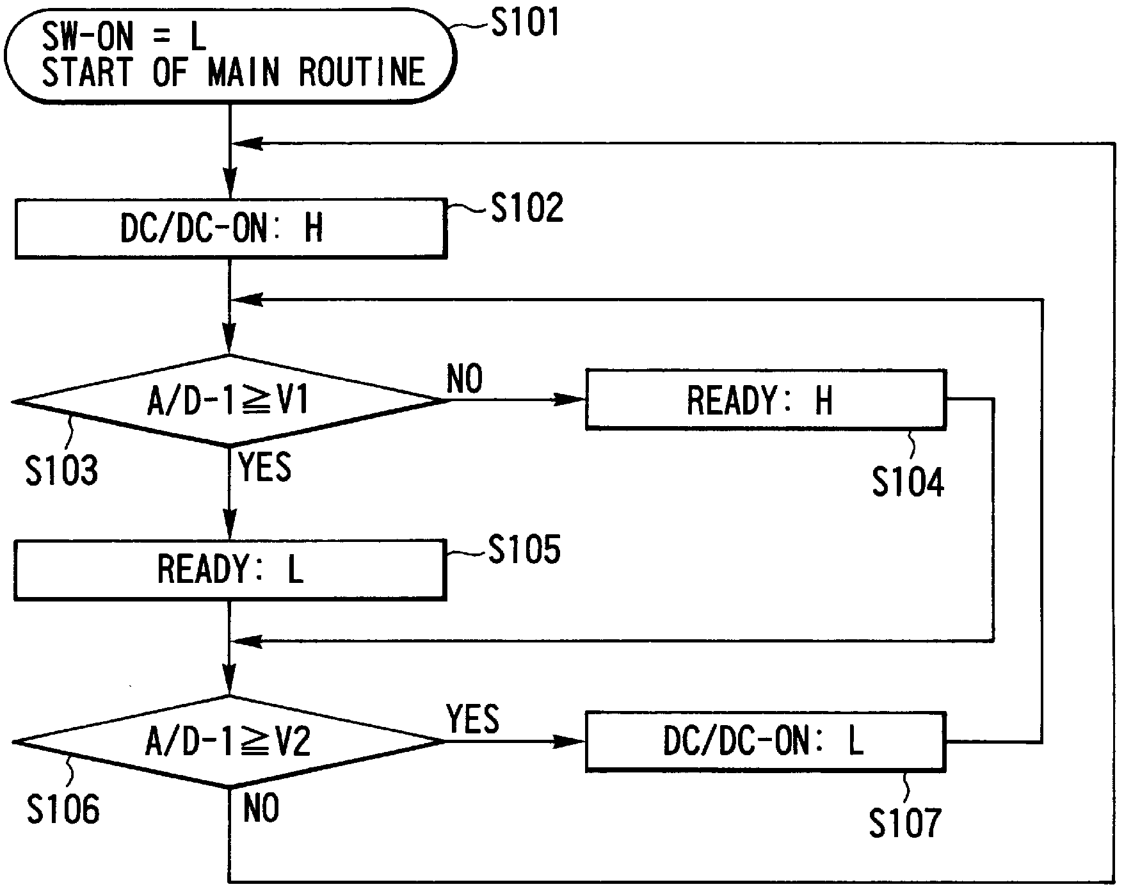
FIG. 4 is a flow chart showing the main routine of actions of the flash device shown in FIG. 1.

FIG. 4 shows in a flow chart the main routine of an operation of the flash device arranged as shown in FIG. 1.

Referring to the flow chart of FIG. 4, when the power supply switch 117 turns on, the microcomputer 111 begins to operate at a step S101.

At a step S102, the output terminal DC/DC-ON of the microcomputer 111 is set at a high level to cause the DC/DC converter 102 to begin its operation. At a step S103, a check is made to find if the charging voltage of the main capacitor 103 has reached a light-emission enabling voltage. For this purpose, the level of the input terminal A/D-1 of the microcomputer 111 is checked to find if it has reached a voltage value V1 or more, which voltage value V1 is a value obtained by dividing the light-emission enabling voltage of the main capacitor 103 with the resistors 104 and 105. If not, the flow of operation proceeds to a step S104. At the step S104, an output terminal READY of the microcomputer 111 is set at a high level to turn off the LED 118, which is arranged to indicate that charging has been completed up to a voltage value required for light emission, and an interruption by a light emission start signal which is allowed to come from the camera (not shown) with the input terminal START/STOP of the microcomputer 111 set at a low level is disabled.

Then, the flow of operation proceeds to a step S106.

If the level of the input terminal A/D-1 is found at the step S103 to be equal to or greater than the voltage value V1, the flow proceeds to a step S105. At the step S105, the output terminal READY of the microcomputer 111 is set at a low level to turn on the LED 118, which is arranged to indicate that charging has been completed up to a voltage value required for light emission, and the interruption by the light emission start signal is enabled.

At the step S106, a check is made to find if the charging voltage of the main capacitor 103 has reached a maximum charging voltage. For this purpose, the level of the input terminal A/D-1 of the microcomputer 111 is checked to find if it has reached a voltage value V2 or more, which voltage value V2 is a value obtained by dividing the maximum charging voltage of the main capacitor 103 with the resistors 104 and 105.

If the level of the input terminal A/D-1 of the microcomputer 111 is found to be equal to or greater than the value V2, the flow proceeds to a step S107 to stop the DC/DC converter 102 from acting by setting the output terminal DC/DC-ON of the microcomputer 111 at a low level, and then the flow returns to the step S103. If not, the flow returns to the step S102. These steps are repeated until the power supply switch 117 turns off.

Figure 5:
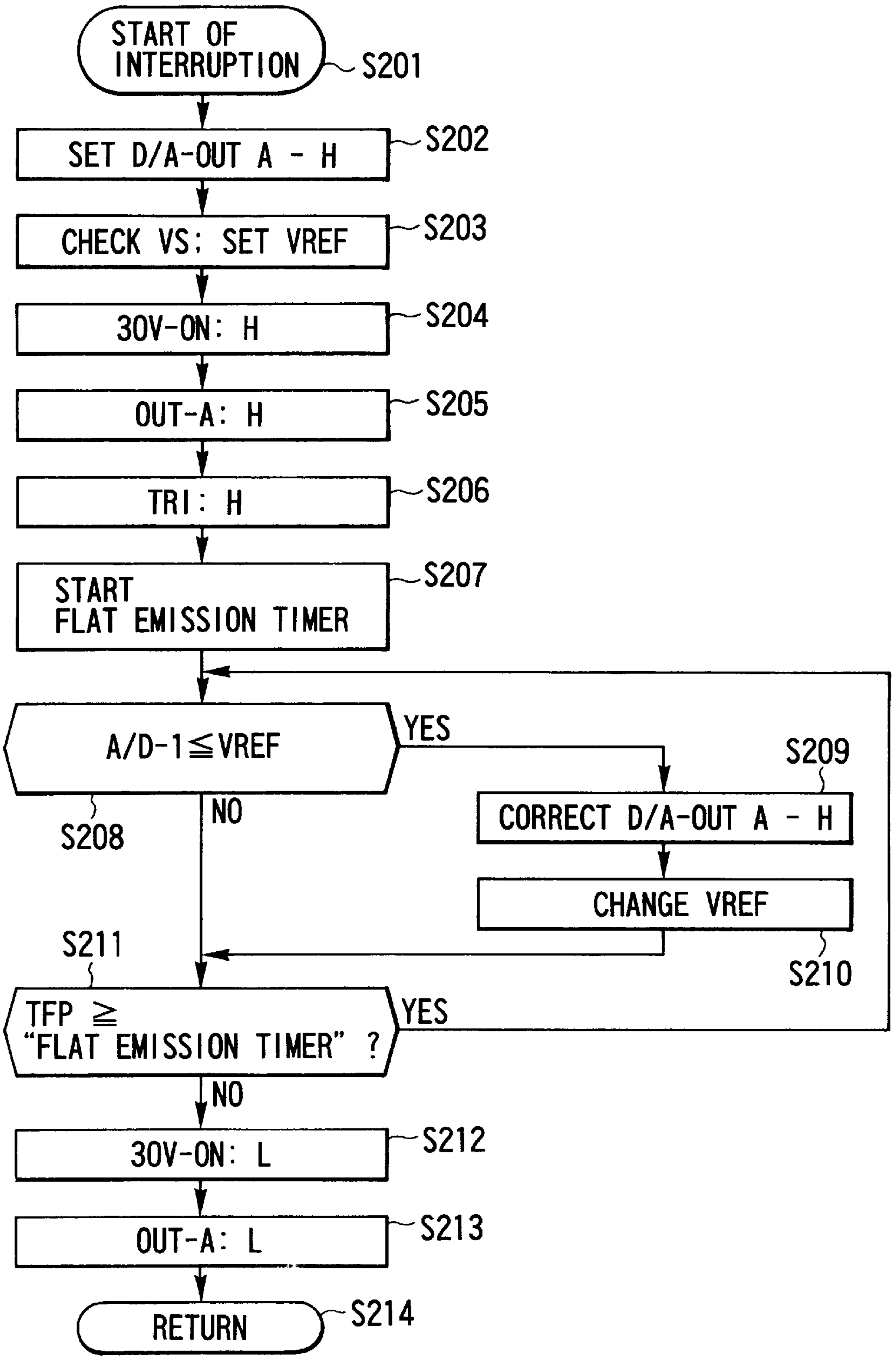
FIG. 5 is a flow chart showing a sequence of actions performed for the flat emission by the flash device arranged as the first embodiment shown in FIG. 1.

FIG. 5 is a flow chart showing a sequence of control actions to be performed for the flat emission by the flash device shown in FIG. 1. Referring to FIG. 5, when the input terminal START/STOP of the microcomputer 111 is set at a low level by the camera, an interruption is allowed to start a flow of operations for the flat emission at a step S201.

At a step S202, the output terminals D/A-OUT A to D/A-OUT H are set at a value indicated by an instruction given through serial communication with the camera. At this point of time, since no light is emitted as yet, the output of the output terminal D/A-OUT of the D/A converter 112 is equal to or greater than the output of the emission intensity monitor circuit 113. Therefore, the output of the comparator 114 is at a high level.

At a step S203, information on a charging voltage VS of the main capacitor 103 before the start of light emission is read from the input terminal A/D-1 of the microcomputer 111. Then, a reference voltage VREF is obtained from the value VS and a setting value correction table and is set. FIG. 6 shows by way of example the setting value correction table, which is prepared beforehand to be used for correcting a setting value and is stored within the microcomputer 111. The reference voltage VREF is obtained in the following manner. Referring to FIG. 6, when the value VS currently read is assumed to be 303V, for example, the reference voltage VREF is initially set at 278V according to a term in a left column reading "303V≦VS<330V", and correction data is set at "1". After a term corresponding to the charging voltage VS before light emission is set in this manner, the reference voltage VREF and the correction data are set on the basis of this term.

As shown in an upper line of the setting value correction table of FIG. 6, the reference voltage VREF is divided stepwise into 12 values 303V to 117V to be correlated to the charging voltage VS. However, it should be noted that the reference voltage values VREF shown are obtained by quantizing stepwise changes taking place in the charging voltage VS of the main capacitor 103 and do not exactly represent the variable correction of values set at the output terminals D/A-OUT A to D/A-OUT H of the microcomputer 111, i.e., a setting value for control over the intensity of light emission by the xenon lamp 107.

At a step S204, the output terminal 30V-ON of the microcomputer 111 is set at a high level. At a step S205, the output terminal OUT-A of the microcomputer 111 is set at a high level. As a result, the input terminal D1 of the signal selector 115 is selected to make the level of its output terminal Y high and that of its inverting output terminal W low. Then, at the light emission control circuit 110, the transistors 213 and 205 turn off and the transistors 211 and 208 turn on to cause the IGBT 201 to turn on.

At a step S206, a high level signal is outputted from the output terminal TRI of the microcomputer 111 for a predetermined period of time. The trigger circuit 109 then applies a trigger signal of a high voltage to the xenon lamp 107 to cause the xenon lamp 107 to begin to emit light.

At a step S207, a timer arranged to control a length of time for the flat emission is started. After the start of light emission, the emission intensity monitor circuit 113 directly receives the light of the xenon lamp 107 and outputs a signal according to the light emission intensity. When the output of the emission intensity monitor circuit 113 comes to exceed a set output of the output terminal D/A-OUT of the D/A converter 112, the output of the comparator 114 is inverted into a low level. As a result, the level of the output terminal Y of the signal selector 115 becomes low while the level of the inverting output terminal W becomes high. At the light emission control circuit 110, the transistors 213 and 205 turn on and the IGBT 201 turns off. Energy accumulated at the inductor 106 then flows from the inductor 106 to the xenon lamp 107 and then to the diode 108. Therefore, a little after the IGBT 201 turns off, the level of the output of the emission intensity monitor circuit 113 begins to drop. When the output of the emission intensity monitor circuit 113 becomes lower than the set level of the output terminal D/A-OUT of the D/A converter 112, the level of the output of the comparator 114 becomes high. At the signal selector 115, the level of the output terminal Y becomes high and the level of the inverting output terminal W becomes low to cause the IGBT 201 to turn on again. At that time, since the xenon lamp 107 is still in process of light emission, the turning-on of the IGBT 201 causes the electric energy of the main capacitor 103 to flow from the main capacitor 103 in the order of the main capacitor 103→the inductor 106→the xenon lamp 107→the IGBT 201→the ground. Therefore, the intensity of light emission again increases. Then, the output of the emission intensity monitor circuit 113 also increases accordingly. The flat emission is maintained by repeating the sequence of these actions in this manner.

At a step 208, the charging voltage VS of the main capacitor 103 is again divided by the resistors 104 and 105 and is read through the input terminal A/D-1 of the microcomputer 111. The voltage thus read is compared with the set reference voltage VREF to find if the charging voltage VS of the main capacitor 103 obtained this time is less than the reference voltage VREF.

If so, the data "1" can be read out from the setting value correction table as setting value correction data corresponding to the change of the charging voltage of the main capacitor 103. In other words, since the term of "303V≦VS<330V" has been set before the light emission on the basis of the charging voltage VS of the main capacitor 103 detected before the light emission as mentioned above, the correction data "1" is read out, in this case, when the charging voltage VS drops to 278V or less.

At a step S209, this data "1" is added to the setting value of the output terminals D/A-OUT A to D/A-OUT H of the microcomputer 111 to reset the setting value for control over the emission intensity.

At a step S210, after the step S209, the value of reference voltage VREF is set at a value shifted one according to the table of FIG. 6. In this case, since the reference voltage VREF which has previously been set at the step S203 is 278V, the reference voltage is rewritten to 255V as the next reference voltage VREF.

In the case of the variable control using a setting value correction table as mentioned above, the control over the reference voltage VREF for changes of the charging voltage of the main capacitor 103 becomes decrement control, while the control over the setting value to be used for controlling the light emission intensity against a drop in the charging voltage becomes increment control. The control is visually shown in FIGS. 3(*a*) and 3(*b*).

Figure 3A:
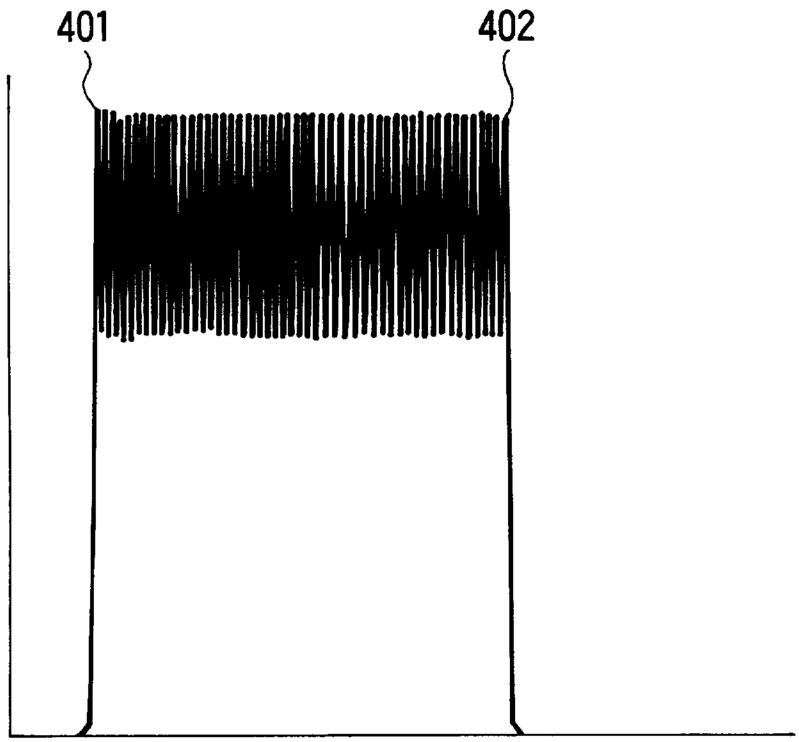
FIGS. 3(*a*) and 3(*b*) show respectively the light emission waveform and a light emission intensity setting value of the flat emission in the flash device shown in FIG. 1.
Figure 3B:
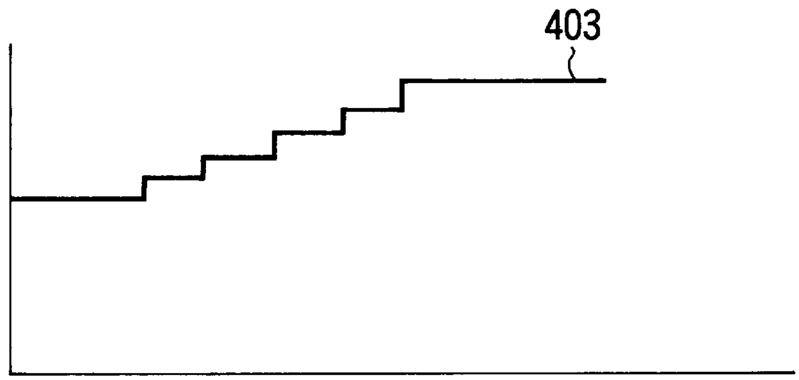
Figure 11A:
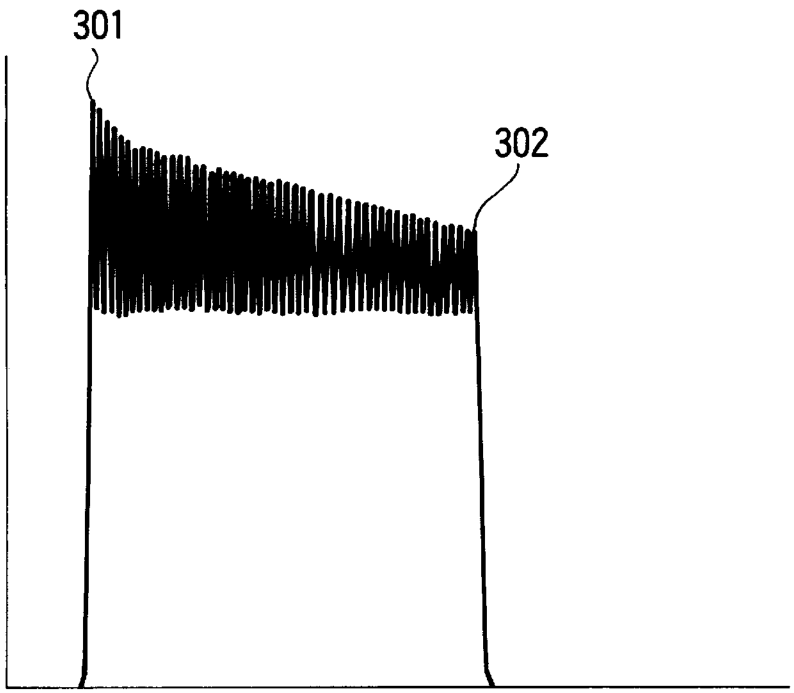
FIGS. 11(*a*) and 11(*b*) show respectively the light emission waveform and a light emission intensity setting value of the flat emission in the conventional flash device.
Figure 11B:
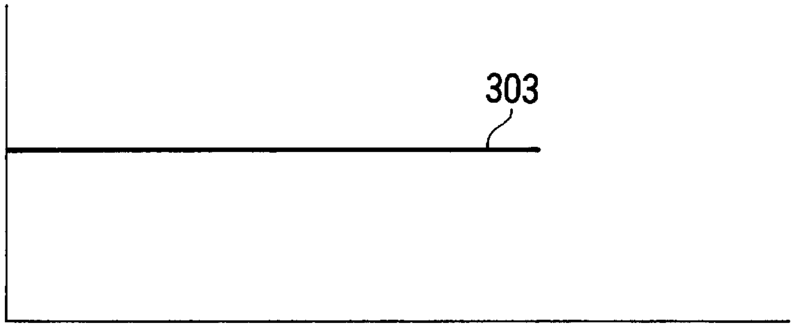
Figure 12B:
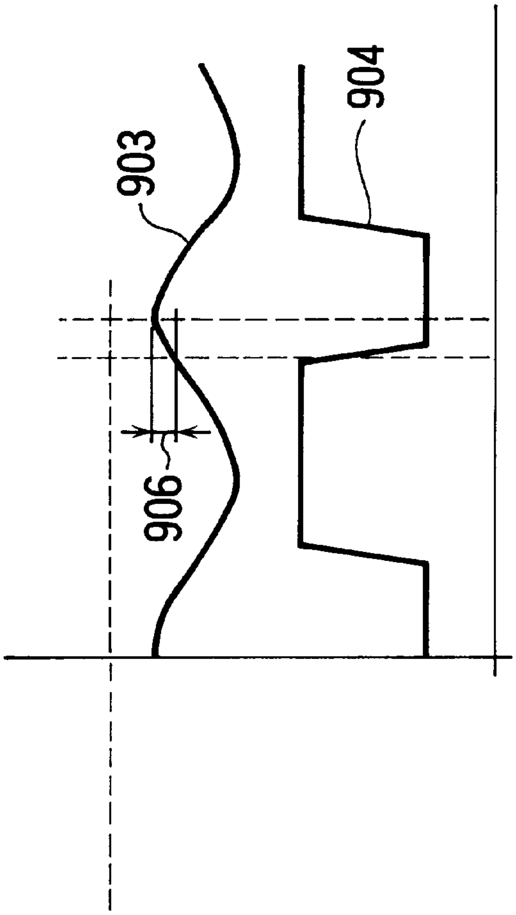
FIGS. 12(*a*) and 12(*b*) each show the light emission waveform of the flat emission and the control signal therefor in the conventional flash device.
Figure 12A:
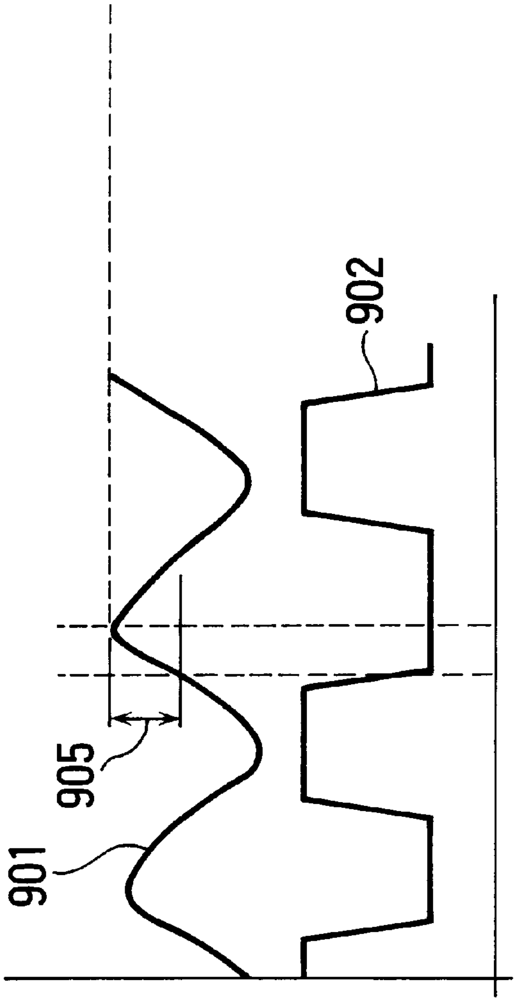

FIG. 3(*a*) shows the waveform of the flat emission made by the flash device shown in FIG. 1. FIG. 3(*b*) shows the control over the setting value 403 to be used for controlling the light emission intensity against a drop in the charging voltage. As shown, the setting value 403 is corrected to increment stepwise for the changes taking place in the charging voltage of the main capacitor 103. Therefore, compared with the light emission waveform obtained by the prior art example shown in FIG. 11(*a*), the light emission intensity obtained in the embodiment becomes constant to ensure more flat emission having an intensity value obtained at the initial point 401 remaining unchanged at the end point 402.

If the charging voltage VS of the main capacitor 103 is found at the step S208 to be higher than the reference voltage VREF, or after completion of the step S210, the flow proceeds to a step S211. At the step S211, the time count by the timer started at the step S207 is compared with a flat emission time TFP designated through serial communication with the camera. If the time count is found to have reached the end of the light emission time, the flow proceeds to a step S212. At the step S212, the output terminal 30V-ON of the microcomputer 111 is set at a low level.

At a step S213, the output terminal OUT-A of the microcomputer 111 is set at a low level to cause the IGBT 201 to turn off. At a step S214, the interruption process for the flat emission then comes to an end, and the flow of operation returns to the main routine.

The embodiment is arranged, as described above, to variably correct the setting value set for control over the light emission intensity using the setting value correction table. The arrangement enables the embodiment to carry out flatter light emission, as shown in FIG. 3(*a*), than the flat emission by the conventional device.

In the case of FIG. 3(*b*), the setting value correction data and the voltage values of the reference voltage VREF are arranged stepwise. The correction data, however, may be expressed, for example, in continuous values obtained by a functional computation on the basis of the charging voltage of the main capacitor 103.

Second Embodiment

Figure 7:
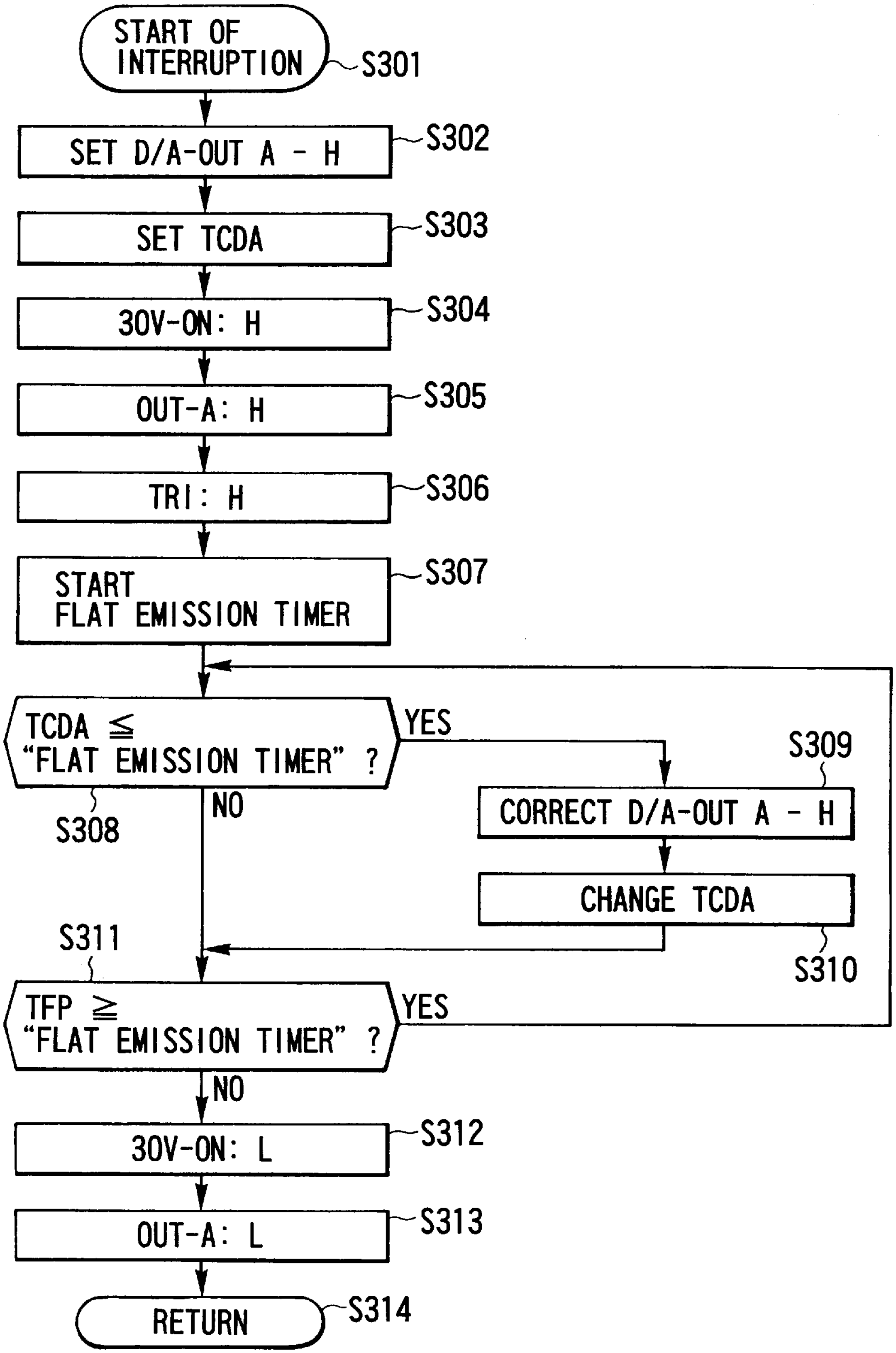
FIG. 7 is a flow chart showing a sequence of actions performed for the flat emission by a flash device arranged as a second embodiment of this invention.

A second embodiment of this invention is next described. FIG. 7 is a flow chart showing a sequence of the flat light emitting actions of a flash device arranged as the second embodiment. FIG. 8 shows by way of example a time correction table of the flash device in the second embodiment. The second embodiment is arranged in the same manner as shown in FIGS. 1 and 2 which show the first embodiment. The main routine of the second embodiment is also identical with that of the first embodiment as shown in FIG. 4. The flat light emitting actions of the second embodiment are described with reference to FIGS. 7 and.8 as follows.

At a step S301, when the input terminal START/STOP of the microcomputer 111 is set at a low level by the camera, an interruption is allowed to start a flow of operations for the flat emission.

At a step S302, the output terminals D/A-OUT A to D/A-OUT H are set at a value indicated by an instruction given through serial communication with the camera. At this point of time, since no light is emitted as yet, the output of the output terminal D/A-OUT of the D/A converter 112 is equal to or greater than the output of the emission intensity monitor circuit 113. Therefore, the output of the comparator 114 is at a high level.

At a step S303, a time TCDA from a start of light emission, upon the lapse of which time the set value of the output terminal D/A-OUT is corrected, is set at 1 mS according to the time correction table shown in FIG. 8. In the case of the second embodiment, the gradual decrease of the charging voltage of the main capacitor 103 is assumed to take place nearly at a constant rate, and the setting value correcting control is carried out at intervals of a predetermined period of time.

While the correcting intervals are set at 1 mS in the time correction table, the intervals can be set wider or narrower as desired or may be not equal intervals.

At a step S304, the output terminal 30V-ON of the microcomputer 111 is set at a high level. At a step S305, the output terminal OUT-A of the microcomputer 111 is set at a high level. As a result, the input terminal D1 of the signal selector 115 is selected to make the level of its inverting output terminal W low. Then, at the light emission control circuit 110, the IGBT 201 is caused to turn on.

At a step S306, a high level signal is outputted from the output terminal TRI of the microcomputer 111 for a predetermined period of time. The trigger circuit 109 then causes the xenon lamp 107 to begin light emission. At a step S307, a timer arranged to control a length of time for the flat emission is started.

The flat light emitting actions are performed in the same manner as in the case of the first embodiment described above. After the start of light emission, when the output of the emission intensity monitor circuit 113 comes to exceed a set output of the output terminal D/A-OUT of the D/A converter 112, the output of the comparator 114 is inverted into a low level. As a result, the level of the inverting output terminal W of the signal selector 115 becomes high to cause the IGBT 201 to turn off. The level of the emission intensity monitor circuit 113 begins to drop a little after the IGBT 201 turns off. When the output of the emission intensity monitor circuit 113 becomes lower than the output of the output terminal D/A-OUT of the D/A converter 112, the level of the output of the comparator 114 becomes high and the level of the inverting output terminal W of the signal selector 115 becomes low to cause the IGBT 201 to turn on again. The electric energy is again allowed to flow from the main capacitor 103 to the Xenon lamp 107 to maintain the flat emission.

At a step S308, the time count value of the flat emission timer is compared with the time TCDA from the start of light emission, upon the lapse of which time the setting value set by the output terminal D/A-OUT of the D/A converter 112 is corrected. If the value of the flat emission timer is found to be less than the value of time TCDA, the flow proceeds to a step S311.

If the value of the flat emission timer is found to be equal to or greater than the time TCDA, the flow proceeds to a step S309. At the step S309, correction data which is one of "1" to "4" in the case of FIG. 8 is added to the value set at the output terminals D/A-OUT A to D/A-OUT H at the step S302, according to the time TCDA shown in the time correction table, which includes time values 1 to 12 mS set stepwise at equal intervals of 1 mS in the case of FIG. 8. The setting value is corrected in this manner by resetting the output terminals D/A-OUT A to D/A-OUT H.

Since the time TCDA is currently set at 1 mS, the correction data is "1". This data value "1" is added to the value set at the output terminals D/A-OUT A to D/A-OUT H at the step S302. A value incremented according to this set value is set as the output of the D/A converter 112.

At a step S310, the value of time TCDA set at the step S303 is changed to a next value of time TCDA. Since the time TCDA has been set at 1 mS at the step S303, the value of time TCDA is changed to 2 mS by the first updating as shown in FIG. 8. At a step S311, the count value of the timer which is started at the step S307 is compared with the flat emission time TFP designated through the serial communication with the camera. If the count value is found to have reached the end of the light emission time, the flow proceeds to a step S312 to set at a low level the output terminal 30V-ON of the microcomputer 111. At a step S313, the output terminal OUT-A of the microcomputer 111 is set at a low level to turn off the IGBT 201. At a step S314, the interruption process comes to an end, and the flow of operation returns to the main routine.

The second embodiment is arranged as described above to increment the output of the D/A converter 112 by a predetermined value at intervals of 1 mS. In other words, the intensity of light emission can be kept flat as shown in FIG. 3(*a*) by simply carrying out variable control according to the time correction table.

In the case of the second embodiment, the correlation between the correction data and the elapsing time is arranged stepwise. However, the arrangement may be changed to perform control by arranging the correction data as continuous values functionally computed on the basis of the elapsing time.

Third Embodiment

Figure 9:
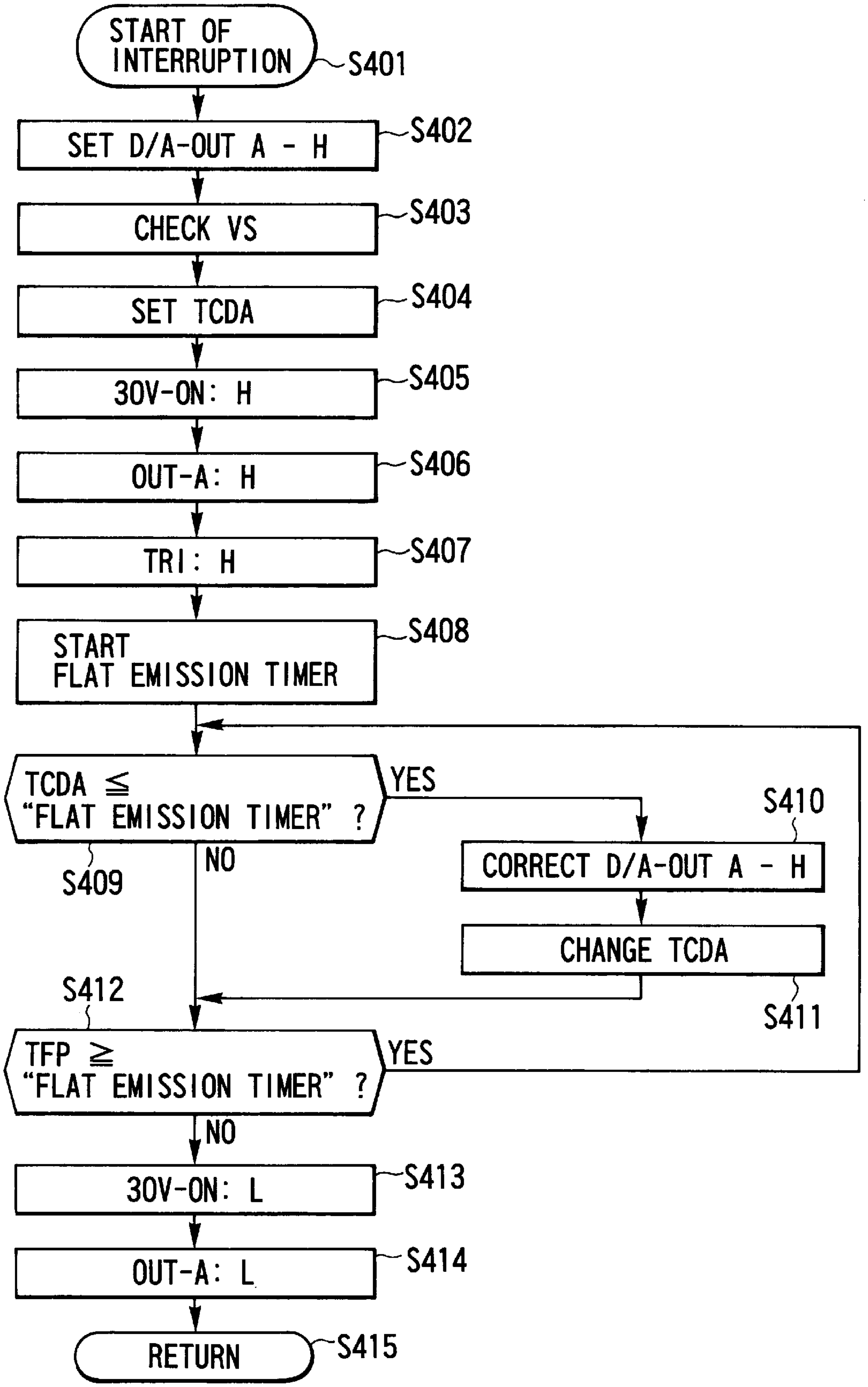
FIG. 9 is a flow chart showing a sequence of actions performed for the flat emission by a flash device arranged as a third embodiment of this invention.

A third embodiment of this invention is next described. FIG. 9 is a flow chart showing a sequence of flat light emitting actions of a flash device which is arranged as the third embodiment of this invention. FIG. 10 shows by way of example a voltage and time correction table in the flash device in the third embodiment. While the flash device in the third embodiment is shown in FIGS. 9 and 10, FIGS. 1 and 2 also apply to the third embodiment. The arrangement and the main routine of the third embodiment are the same as those of the first embodiment and are, therefore, omitted from the following description.

Referring to FIGS. 9 and 10, at a step S401, when the input terminal START/STOP of the microcomputer 111 is set at a low level, an interruption is allowed and the sequence of flat light emitting actions is executed.

At a step S402, the output terminals D/A-OUT A to D/A-OUT H are set at a value indicated by an instruction given through serial communication with the camera. At this point of time, since no light is emitted as yet, the output of the comparator 114 is at a high level.

At a step S403, the charging voltage VS of the main capacitor 103 before the start of light emission is read at the terminal A/D-1 of the microcomputer 111 by dividing the charging voltage VS with the resistors 104 and 105. An applicable term of the correction table shown in FIG. 10 is set. For example, if the charging voltage VS is 310V, a term of "303V≦VS<330V" is set. Then, the setting value correction data is "1" for the time TCDA values 1 to 3 mS, "2" for the time TCDA values 4 to 6 mS. A correcting process is set in this manner. At a step S404, the time TCDA from the start of light emission is set at 1 mS.

In the case of the third embodiment, the correction table is prepared according to both the charging voltage obtained before light emission of the main capacitor 103 and the time elapsing from the start of flat emission. Control over the flat emission is thus carried out on the basis of the voltage and time. While the setting value correcting intervals are equally set at 1 mS, the intervals may be set wider or narrower than that as desired or may be unequally set.

At a step S405, the output terminal 30V-ON of the microcomputer 111 is set at a high level. At a step S406, the output terminal OUT-A of the microcomputer 111 is set at a high level. As a result, the input terminal D1 of the signal selector 115 is selected to make the level of its inverting output terminal W low. Then, the IGBT 201 is caused to turn on.

At a step S407, a high level signal is outputted from the output terminal TRI of the microcomputer 111 for a predetermined period of time. The trigger circuit 109 then causes the xenon lamp 107 to begin to emit light. At a step S408, a timer used for controlling the time of the flat emission is started.

The flat emission is carried out in the same manner as in the case of the preceding embodiment described above. When the output of the emission intensity monitor circuit 113 becomes larger than the output of the output terminal D/A-OUT of the D/A converter 112 after the commencement of light emission, the output of the comparator 114 is inverted to a low level to cause the level of the inverting output terminal W of the signal selector 115 to become a high level. The IGBT 201 then turns off. The output of the emission intensity monitor circuit 113 begins to decrease a little after the IGBT 201 turns off. When the output of the emission intensity monitor circuit 113 becomes lower than the level of the output of the output terminal D/A-OUT of the D/A converter 112, the level of the output of the inverting output terminal W of the signal selector 115 becomes low to cause the IGBT 201 to turn on again. With the IGBT 201 turned on, the electric energy again begins to flow from the main capacitor 103 to the Xenon lamp 107 to increase the quantity of light emission to maintain the flat emission.

At a step S409, the count value of the flat emission timer is compared with the time TCDA from the start of light emission, upon the lapse of which time the value set by the output terminal D/A-OUT of the D/A converter 112 is corrected. If the value of the flat emission timer is found to be smaller than the value of time TCDA, the flow proceeds to a step S412.

If the value of the flat emission timer is found to be equal to or greater than the value of time TCDA, the flow proceeds to a step S410. At the step S410, correction data which is obtained from the voltage and time correction table of FIG. 10 on the basis of the charging voltage VS set at the step S403 is added to the value set at the output terminals D/A-OUT A to D/A-OUT H at the step S402. At a step S411, the value of time TCDA from the start of light emission to be corrected is next rewritten and updated. Further, these steps S410 and S411 are executed in the same manner as the corresponding steps of the second embodiment described in the foregoing.

At a step S412, the count value of the timer which has started at the step S408 is compared with the flat emission time TFP designated through the serial communication with the camera. If the count value is found to have reached the end of the light emission time TFP, the flow proceeds to a step S413 to set at a low level the output terminal 30V-ON of the microcomputer 111. At a step S414, the output terminal OUT-A of the microcomputer 111 is set at a low level to turn off the IGBT 201. At a step S415, the interruption process comes to an end, and the flow of operation returns to the main routine.

The third embodiment is arranged, as described above, to prepare the correction table according to the voltage of the main capacitor 103 obtained at the start of light emission and the time elapsing from the start of the flat emission. The setting value of intensity of light emission is corrected thus on the basis of both the voltage obtained at the start of light emission and the time elapsing from the start of the flat emission. The arrangement permits finer correction control.

Further, in this case, the correlation between the correction data and the elapsing time is arranged stepwise. However, the arrangement may be changed to arrange the correction data as continuous values functionally computed on the basis of the time elapsing from the start of light emission.

I claim:

1. A flash device which performs the flat emission, for a predetermined period of time, by making flash emission by intermittently discharging a flash light energy supplied from a flash light energy source to a discharge tube, and by controlling the intermittent discharging by detecting whether intensity of the flash emission from the discharge tube has reached a predetermined detection level, said flash device comprising:

a) a varying circuit which varies a relationship between the intensity of the flash emission and the detection level during process of the flat emission for the predetermined period of time.

2. A device according to claim 1, wherein said varying circuit sets the detection level at a higher level in an ending stage of the flat emission than in an initial stage of the flat emission.

3. A device according to claim 1, wherein said varying circuit varies the relationship between the intensity of the flash emission and the detection level in accordance with a change of a voltage level of the flash light energy source.

4. A device according to claim 1, wherein said varying circuit varies the relationship between the intensity of the flash emission and the detection level in accordance with a period of time having elapsed from beginning of the flat emission.

5. A flash device for flat emission, having a capacitor arranged to store electric energy therein, a discharge tube arranged to convert the electric energy into light, a light emission control circuit for controlling light emission of said discharge tube, and an intensity control circuit arranged to control intensity of the light emission of said discharge tube by outputting a light emission stop signal to the light emission control circuit when the intensity of the light emission of said discharge tube becomes equal to or higher than a setting value and outputting a light emission start signal to the light emission control circuit when the intensity of the light emission of said discharge tube becomes lower than the setting value, said flash device comprising:

a) a variable control circuit which performs the flat emission while varying the setting value for the intensity of the light emission to be used by said intensity control circuit, during a period of from beginning of the flat emission to ending of the flat emission.

6. A device according to claim 5, wherein said variable control circuit varies the setting value for the intensity of the light emission to be used by said intensity control circuit, in accordance with a charging voltage of said capacitor.

7. A device according to claim 5, wherein said variable control circuit varies the setting value for the intensity of the light emission to be used by said intensity control circuit, in accordance with a period of time having elapsed from beginning of the flat emission.

8. A device according to claim 5, wherein said variable control circuit varies the setting value for the intensity of the light emission to be used by said intensity control circuit, in accordance with a period of time having elapsed from beginning of the flat emission and a charging voltage of said capacitor.

9. A device according to claim 6, wherein said variable control circuit varies the setting value for the intensity of the light emission by making reference to a setting value correction table which correlates the setting value with the charging voltage of said capacitor.

10. A device according to claim 7, wherein said variable control circuit varies the setting value for the intensity of the light emission by making reference to a time correction table which correlates the setting value with the period of time having elapsed from beginning of the flat emission.

11. A device according to claim 8, wherein said variable control circuit varies the setting value for the intensity of the light emission by making reference to a voltage and time correction table which correlates the setting value with the charging voltage of said capacitor and the period of time having elapsed from beginning of the flat emission.

12. A flash device having a capacitor arranged to store electric energy therein, a discharge tube arranged to discharge electric charge from said capacitor, and a switching element connected in series to said discharge tube, and arranged to perform flat emission by turning off said switching element when intensity of light emission of said discharge tube comes into a first predetermined relation to a setting value during an on-state of said switching element and turning on said switching element when the intensity of light emission of said discharge tube comes into a second predetermined relation to the setting value during an off-state of said switching element, said flash device comprising:

a) a varying circuit which varies the first and second predetermined relation between the intensity of light emission and the setting value during process of the flat emission.

13. A device according to claim 12, wherein said varying circuit varies the first and second predetermined relation in accordance with a voltage of said capacitor.

14. A device according to claim 12, wherein said varying circuit varies the first and second predetermined relation in accordance with a period of time having elapsed from beginning of the flat emission.

15. A device according to claim 12, wherein said flash device turns off said switching element when the intensity of light emission of said discharge tube exceeds the setting value during the on-state of said switching element and turns on said switching element when the intensity of light emission of said discharge tube becomes less than the setting value during the off-state of said switching element.

16. A device according to claim 15, wherein said varying circuit sets the setting value at a higher value in an ending stage of the flat emission than in an initial stage of the flat emission.

17. A flash device which performs flat emission for a predetermined period of time by making flash emission by intermittently discharging a flash light energy supplied from a flash light energy source to a discharge tube, and by controlling the intermittent discharging by detecting whether intensity of the flash emission from the discharge tube has reached a predetermined detection level, said flash device comprising:

a) a varying circuit which varies the detection level during process of the flat emission for the predetermined period of time.

18. A device according to claim 17, wherein said varying circuit sets the detection level at a higher level in an ending stage of the flat emission than in an initial stage of the flat emission.

19. A device according to claim 17, wherein said varying circuit varies the detection level in accordance with a change of a voltage level of the flash light energy source.

20. A device according to claim 17, wherein said varying circuit varies the detection level in accordance with a period of time having elapsed from beginning of the flat emission.

* * * * *

UNITED STATES PATENT AND TRADEMARK OFFICE

CERTIFICATE OF CORRECTION

PATENT NO. : 5,956,535

DATED : September 21, 1999

INVENTOR(S) : Kei Tobyama

It is certified that error appears in the above-identified patent and that said Letters Patent are hereby corrected as shown below:

Col. 8, line 16, delete "and.8" and insert -- and 8 --.

Signed and Sealed this

Third Day of April, 2001

*Attest:*

Nicholas P. Godici

NICHOLAS P. GODICI

*Attesting Officer* *Acting Director of the United States Patent and Trademark Office*